(12) United States Patent
Schauer et al.

(10) Patent No.: US 7,830,218 B2
(45) Date of Patent: Nov. 9, 2010

(54) COMMUNICATIONS DEVICE AND DATA TRANSMISSION METHOD

(75) Inventors: Karl-Heinz Schauer, Vaihingen (DE);
Bernhard Mader, Kernen (DE); Ingo Pietsch, Karlsruhe (DE); Timo Schmidt, Nufringen (DE); Thomas Holst, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 11/893,756

(22) Filed: Aug. 17, 2007

(65) Prior Publication Data

US 2008/0049829 A1 Feb. 28, 2008

(30) Foreign Application Priority Data

Aug. 25, 2006 (DE) .................... 10 2006 039 985

(51) Int. Cl.
*H03K 7/08* (2006.01)
(52) U.S. Cl. .................. 332/109; 332/106; 340/636.12; 375/238; 701/103
(58) Field of Classification Search .................. 332/106, 332/109; 375/238; 701/101–105; 327/106, 327/166, 176; 340/636.12, 636.13, 636.15
See application file for complete search history.

(56) References Cited

U.S. PATENT DOCUMENTS

| 4,977,508 | A | * | 12/1990 | Tanaka et al. ................ 701/111 |
| 5,539,388 | A | * | 7/1996 | Modgil ........................ 340/3.2 |
| 5,635,896 | A | * | 6/1997 | Tinsley et al. .......... 340/310.15 |
| 2006/0038661 | A1 | | 2/2006 | Reinhold et al. |

FOREIGN PATENT DOCUMENTS

| DE | 102 44 094 | 4/2004 |
| EP | 0660287 | 6/1995 |
| WO | WO9418803 | 8/1994 |

* cited by examiner

*Primary Examiner*—Robert Pascal
*Assistant Examiner*—Levi Gannon
(74) *Attorney, Agent, or Firm*—Kenyon & Kenyon LLP

(57) ABSTRACT

A communications device includes a supply terminal which is able to be connected to a two-position-controlled power supply; a pulse width recording device, which is coupled to the supply terminal and which records a pulse width of current pulses that flow through the supply terminal, and a signal processing device which assigns a first logical level to a first recorded pulse width and a second logical level to a second recorded pulse width.

9 Claims, 6 Drawing Sheets

COMMUNICATIONS DEVICE AND DATA TRANSMISSION METHOD

FIELD OF THE INVENTION

The present invention relates to a communications device, in particular a communications apparatus that is integrated into a fuel injector, and actuator or a magnetic coil actuator. In addition, the present invention relates to a data transmission method which the above-named communications device can use.

BACKGROUND INFORMATION

A problem which may be addressed by the present invention is described below, in an example for injection valves or injectors for internal combustion engines.

Modern engines attain a high energy yield per fuel quantity unit used, and an exhaust that is low in pollutants, based among other things on precise injection of the fuel into the combustion chambers. In this connection, both the great accuracy of the time of injection and of the injection quantity is ensured by an injection control. The injection control controls a plurality of injectors.

Because of manufacturing conditions, the injectors have tolerances with respect to the injection quantity as a function of parameters such as the control time, fuel chamber pressure, etc. In order to ensure precise injection in spite of these tolerances, each injector is measured individually. The characteristics curves of the respective injectors ascertained in this connection are, for example, printed onto them in bar code or are stored in an EEPROM of the injector, as is described in German Patent Application No. DE 102 44 094 A1.

Before or during the mounting of the injectors, the characteristics curves are read in or out and transmitted to the injector control. Besides the EEPROM on the injectors, the injectors described in German Patent No. DE 102 44 094 have an additional data connection via which the characteristics curves are able to be read out by the injection control. The additional connections and data lines require an increased wiring expenditure and represent additional potential weak points, for instance, on account of loose connections.

SUMMARY

An example communications device according to the present invention, advantageously requires no additional data line, but is able to transmit data via the existing supply lines.

According to a first aspect, an example communications device is provided according to the present invention, which includes a supply terminal which is able to be connected to an two-position-controlled power supply; a pulse width recording device which is coupled to the supply terminal and which records a pulse width of current pulses that flow through the supply terminal, and a signal processing device which assigns a first logical level to a first recorded pulse width and a second logical level to a second recorded pulse width.

According to a second aspect of the present invention an example communications device is provided, which includes a supply terminal which is connected to an two-position-controlled power supply, and a switching arrangement which, to transmit a first logical level, increases the current flow through the supply terminal in order to reduce a pulse width of current pulses of the two-position-controlled power supply.

A two-position-controlled power supply feeds a current to a consumer in a pulsed manner. A new current pulse, in this instance, begins when the current through a measuring resistor of the power supply falls below a lower threshold value, and the new current pulse ends when the current through the measuring resistor exceeds an upper threshold value. The pulse rate, pulse width, period of the pulses are a function of the current flow through the consumer. The switching device changes this current flow and thereby influences the pulse width. A receiving device formed by a pulse width recording device and a signal processing device evaluate the pulse width for its information content.

Therefore, besides the supply lines, no data line is required for the communications device.

The example communications device according to the first and the second aspect can be integrated in a combined send and receive device.

According to one example embodiment, the communications device has a constant current source which can be connected to the supply terminal via the switching arrangement. The constant current source raises the current flow by an additional current flow through the measuring resistor of the two-position-controlled current source, and thus leads to an early ending of the current pulse. The current additionally fed in is advantageously independent of outer conditions, especially the current flow through the consumer.

According to another example embodiment, a bypass resistor or a bypass capacitor is provided, which forms a series connection with the switching arrangement, and the series connection connecting the supply terminal to a reference potential. A simple circuit can be implemented because of this. The bypass capacitor increases the current flow at least for a short time.

In one example embodiment, the communications device is integrated into an actuator and/or a control device for the actuator. The actuator can include operating elements, injectors, pumping systems, stepper motors, etc.

According to one example refinement, a protective circuit is provided which switches the switching arrangement in a blocking manner when the pulse width recording device records a pulse width that is outside a predetermined interval. Simultaneous communication and operation of the actuator can influence each other negatively, and even lead to damage of the communications device. The switching frequency is in a typical range for the control system and the actuator, in the case of the operation of the actuator. Therefore, no communication takes place if the switching frequency is in this typical range or the predetermined range.

According to one further example aspect of the present invention, a data transmission method is provided for receiving, which includes connecting the supply terminal to a two-position power supply; recording the pulse width of current pulses of the two-position power supply at the supply terminal; and assigning a first logical level to a first recorded pulse width and a second logical level to a second recorded pulse width.

According to one further example aspect of the present invention, a data transmission method is provided for sending, which has the following steps and can be executed using the communications device according to the present invention: connecting the supply terminal with a two-position power supply; and raising the current flow through the supply terminal for transmitting a first logical level of at least two logical levels.

According to one example embodiment, data are transmitted to an actuator which is activated by a two-position power supply if the average current exceeds a threshold value, and data transmission takes place if the average current is less than the threshold value.

DETAILED DESCRIPTION OF EXAMPLE EMBODIMENTS

Figure 1:
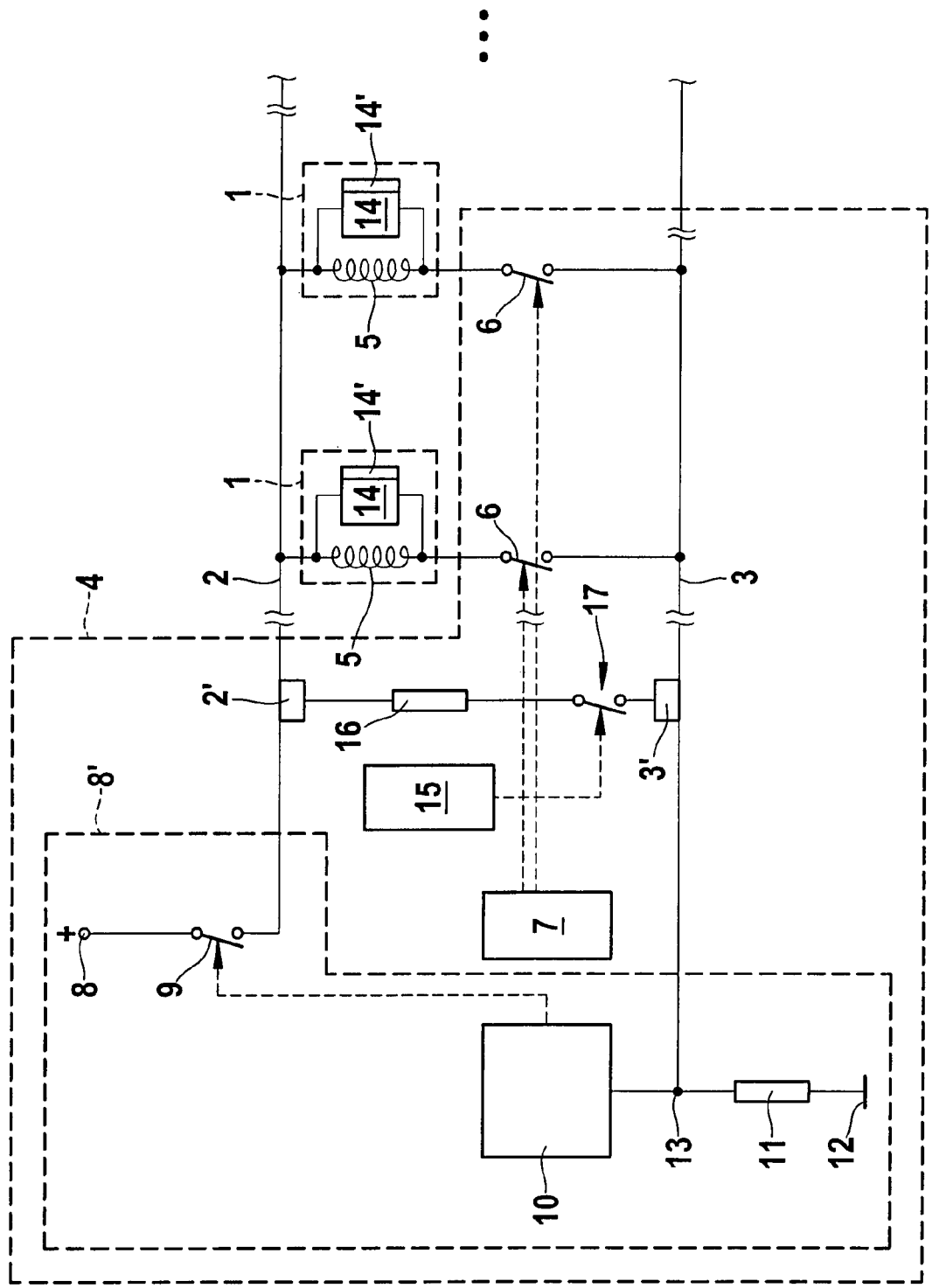
FIG. 1 shows a block diagram of a first specific embodiment of the communications device according to the present invention.

A first specific example embodiment is explained with reference to FIG. 1. A plurality of injectors 1 connected in parallel, having supply terminals 2', 3', is connected over a common supply strand 2, 3 to a control unit 4. Injectors 1 have an electromagnet and a corresponding coil 5, which is used for opening a nozzle of injector 1. By feeding a current into line strand 2, 3, the nozzle is opened using control unit 4. As a result, fuel is injected by injector 1 into the fuel chamber. The addressing of the individual injectors 1 is carried out by switching elements 6, which are switched by an addressing unit 7 of control unit 4.

It proves expedient to provide the current for activating injectors 1, that is, for opening the nozzles, not as direct current but as clocked current. The reasons for this are lower losses in the supply of individual injectors 1.

The pulsed or switched current is generated by a two-position control. This two-position control 8' includes a voltage source 8, a switching element 9, a control unit 10 and a measuring resistor 11. Control unit 10 records a current flow from voltage source 8 through the consumers, that is, in this case, injectors 1, through measuring resistor 11 to a ground 12. A voltage is expediently recorded on a measuring tap 13 at measuring resistor 11. Control device 10 compares the recorded voltage to an upper threshold value and switches switching element 9 into a blocking state if the upper threshold value is exceeded. Thereupon the current flow through measuring resistor 11 is reduced, and the voltage at measuring tap 13 falls off corresponding to a time constant. The time constant is determined predominantly by the inductance of injectors 1 and their electromagnets 5, as well as the ohmic resistances of the supply lines. After the voltage at measuring tap 13 falls below a lower threshold value, switching element 9 is switched through by control unit 10. The current through measuring resistor 11 now rises again corresponding to the previous time constant, and a further cycle of two-position-controlled power supply 8' begins. The two points are appropriately the lower and the upper threshold value.

The first specific example embodiment described makes possible communication between control unit 4 and each of injectors 1. In this context, for example, control unit 4 is described only as a sending device and injectors 1 only as a receiving device, in this case.

Injectors 1 each have a pulse width recording device 14. As shown in FIG. 1, this coil of electromagnet 5 can be connected in parallel. The pulse width recording device determines the pulse length of a current pulse of the two-position-controlled power supply 8'. Instead of the pulse width, the pulse width recording device can also record the repetition rate of the pulses or similar variables, which are uniquely coupled with the pulse width. The pulse width depends on the time constant which is specified by the current path between voltage source 8 and ground 12.

In control unit 4 or next to control unit 4 there is situated a transmitting device 15 and an additional current flow path as well as a switching unit 17. A simple implementation of the current flow path is a passive resistor 16 or a capacitor. Via switching unit 17, the additional current flow path can be switched with injectors 1 in parallel into the current flow path between voltage supply 8 and ground 12. In the variant shown in FIG. 1, connectible additional current flow path 16, 17 is connected between feeding power supply line 2 and feedback power supply line 3. Switching element 17 is operated by transmitting device 15.

The functioning method of the data transmission using transmitting device 15 and additional current path 16 is illustrated below in exemplary fashion in light of FIGS. 2a to 2d.

Figure 2A:
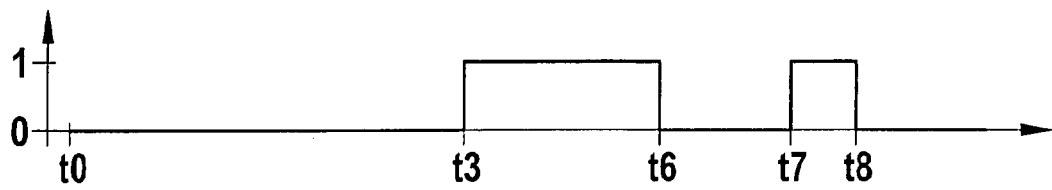
FIGS. 2a-2d show signal curves in connection with the first specific embodiment.

FIG. 2a shows the switching state of switching unit 17. The blocking state of switching unit 17 is given as level 0 and the switched through state as level 1 in FIG. 2a.

Figure 2B:
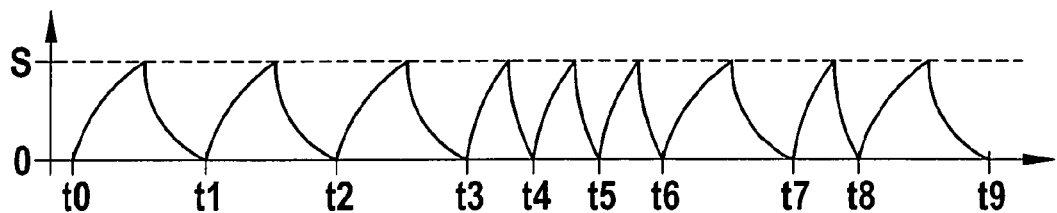

In FIG. 2b, the voltage level is shown schematically at measuring tap 13. Beginning at a time t0, the current flow through measuring resistor 11 rises to an upper threshold value S, and then switching unit 9 switches to the blocking state, and the current flow through measuring resistor 11 correspondingly decays to lower threshold value 0. The time span between times t0 and t1 is specified by the time constant of the current path between voltage supply 8 and ground 12.

Figure 2C:
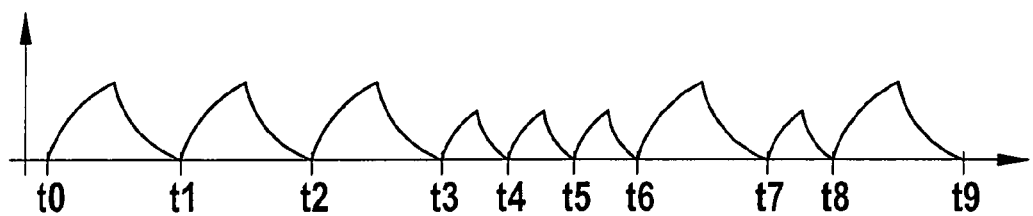

FIG. 2c shows the corresponding current flow through magnet coil 5 of injector 1.

At time t3, switching unit 17 is switched through, for instance, by a corresponding command of transmitting device 15.

Additional current flow path 16 reduces the impedance in the current path between voltage supply 8 and ground 12. Because of this, the time constant is also reduced. This is shown in FIG. 2b, in which at time t3 the current through resistor 11 rises faster after the switching of switching unit 9, but also drops off faster, in the same way. The pulse width of two-position-controlled power supply 8' is now less. If, for example, after time t6 switching unit 17 is switched to blocking again, the time constant increases, as shown in FIG. 2b, after time t6. The current flow through additional current path 16 decreases the current flow through injector 1, as shown in FIG. 2c, between times t3 and t6.

The current curves indicated in FIGS. 2b and 2c are the result of passive resistor 16, which either has current flowing through it or does not have current flowing through it. This leads to an additional d.c. component or rather a positive current pulse, when a capacitor is used.

Figure 2D:
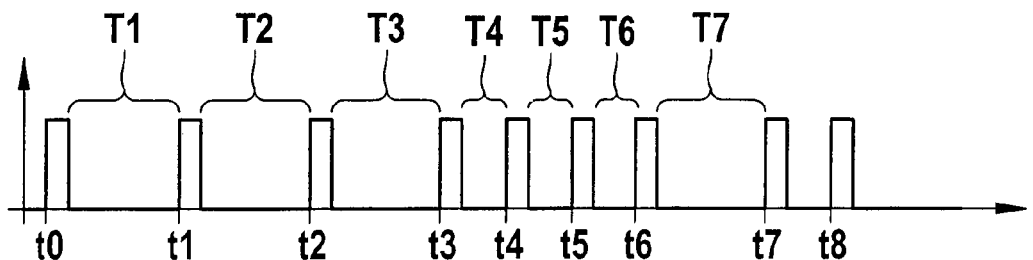

FIG. 2d shows an output signal of a triggering unit which is connected to input 2' of injector 1. This triggering unit emits a pulse each time the current flow through magnetic coil 5 increases. Such a triggering unit can be integrated into pulse width recording device 14. The recording device determines the time span T1-T7 between two successive trigger pulses. Furthermore, time span T1-T7 is compared to a threshold value which is then assigned correspondingly to an upper or a lower logical level.

The information transmitting device 15 impresses on the pulse width of the power supply, using switching unit 17, is detected by pulse width recording device 14 and a signal processing device 14' and is decoded, for instance, using a threshold value. The threshold value can be adapted to the operating conditions. In this context, the change of the resistance of the coils plotted against the temperature can be taken into consideration, among other things.

Figure 3:
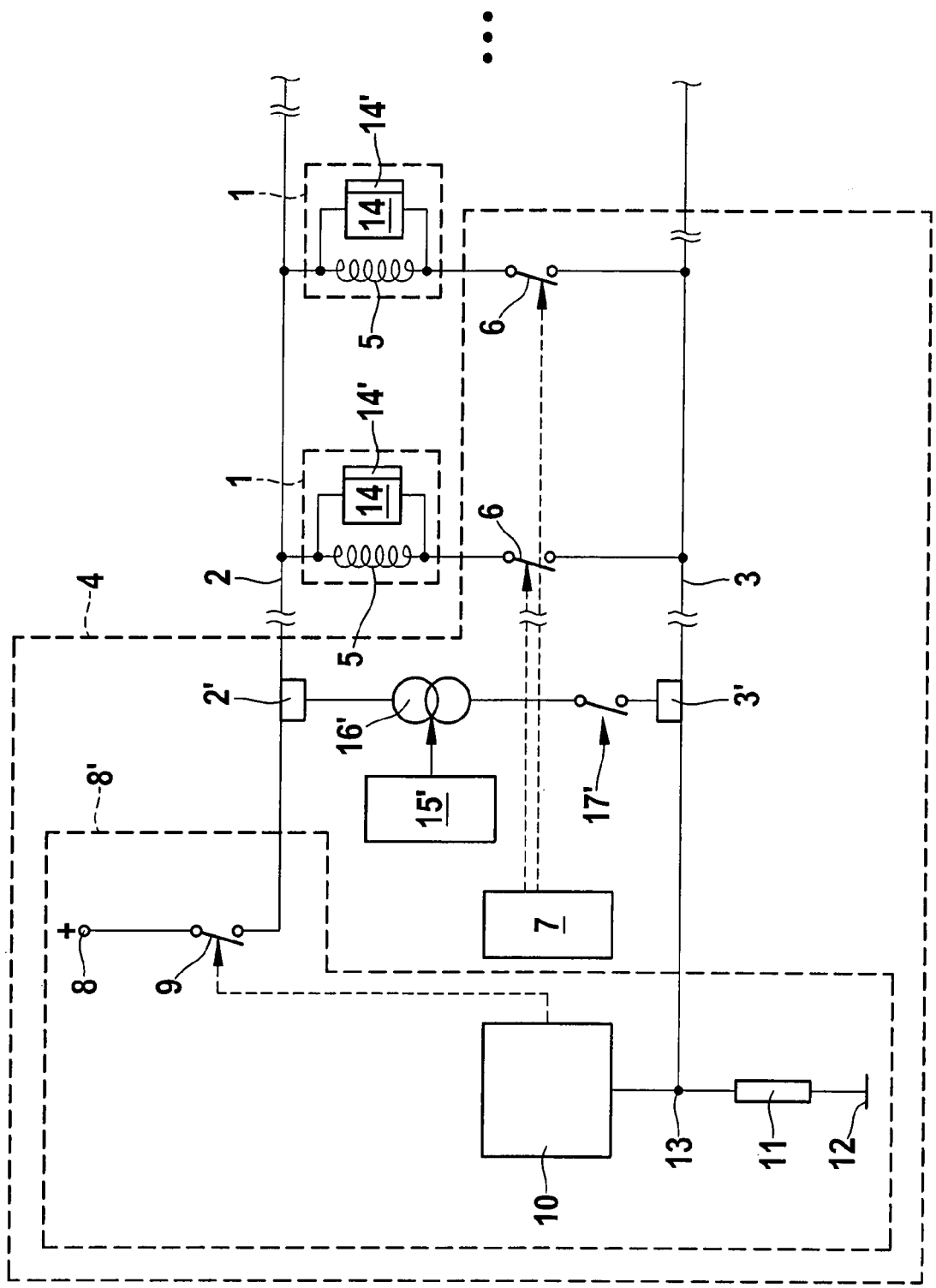
FIG. 3 shows a block diagram of a second specific embodiment of the communications device according to the present invention.

In a second specific example embodiment, the additional current path is preferably implemented by a constant current source 16' (FIG. 3). The constant current source 16' is connected to feedback supply line 3, and thus also to measuring resistor 11. The additional current generated by constant current source 16' increases the potential at measuring tap 13. Correspondingly, control device 10 of two-position-controlled power supply 8' switches switching element 9 earlier to blocking. This is shown schematically in FIGS. 4a to 4d, which lean upon FIGS. 2a to 2d. At times t0 to t3, the constant current source is not switched in, for instance, because a switching element 17' blocks the additional current path. In another variant, the current is controlled from constant current source 16' directly by a transmitting device 15'.

Figure 4A:
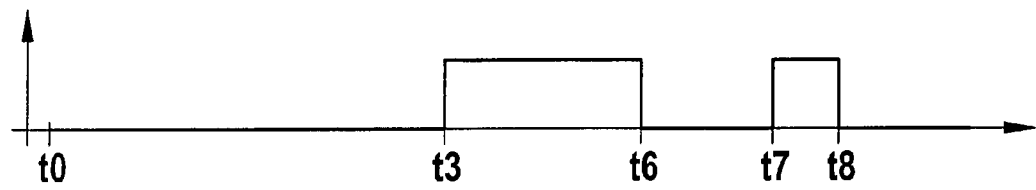
FIGS. 4a-4d show signal curves in connection with the second specific embodiment.
Figure 4B:
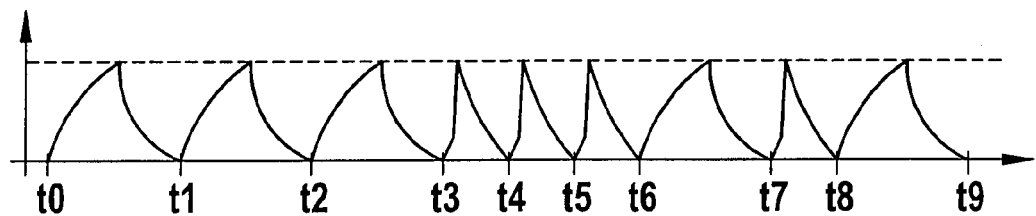
Figure 4C:
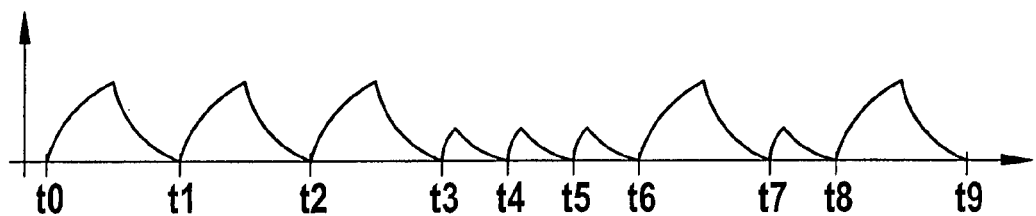
Figure 4D:
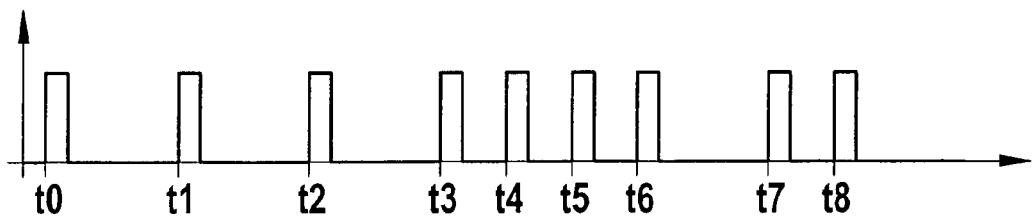

Beginning at t3, and up to time t6, constant current source 16 is connected. A very rapid rise in current flow through measuring resistor 11 comes about, as seen in FIG. 4b. After the two-position-controlled supply of switching element 9 switches to blocking, constant current source 16 is deactivated. Thereupon the current flowing through measuring resistor 11 drops off. The shutting down of the constant current source can be implemented by feeding the constant current source by the two-position-controlled power supply.

Figure 5:
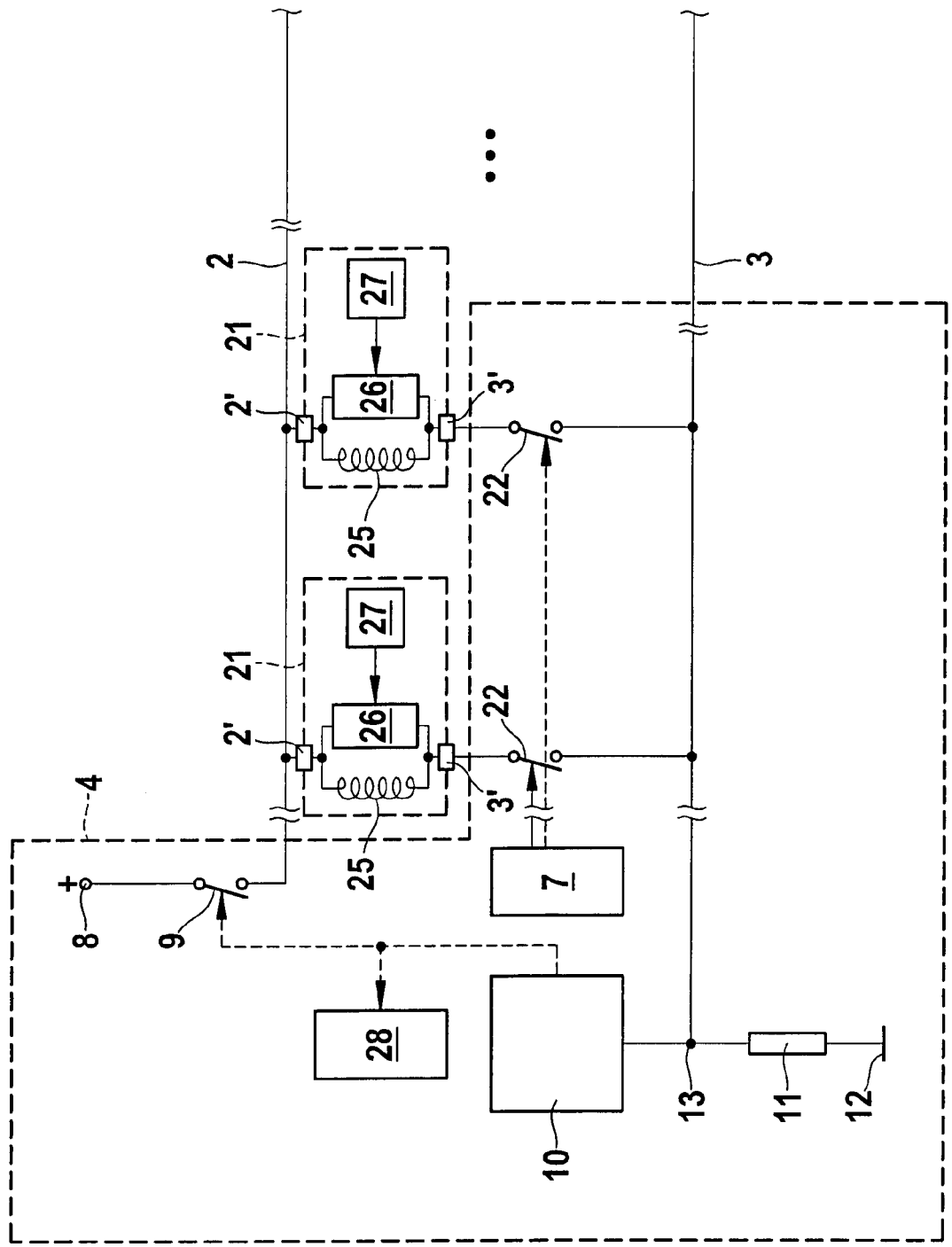
FIG. 5 shows a block diagram of a third specific embodiment of the communications device according to the present invention.

A third specific example embodiment is shown in FIG. 5. In this specific embodiment, injectors 21 send data to injection control unit 4. Injection control unit 4, same as in the first specific embodiment of FIG. 1, has a two-position-controlled power supply having a voltage supply 8, a switching element 9, a control unit 10, and a measuring resistor 11. In addition, injection control unit 4 has an addressing unit 7 which is coupled to switching elements 22 which are each assigned to one injector 21.

The injectors, besides a coil 25 for an electromagnet, have an additional current path 26. This additional current path 26 can be connected in parallel to coil 25 by a data transmission unit 27.

The functional principle for transmitting data corresponds to the one explained in connection with the first specific example embodiment of FIG. 1. The pulse widths of the current pulses of the two-position-controlled power supply are a function of the inductance and the resistance between the supplying and feeding back supply lines 2, 3. The pulse width is reduced by increasing the current by the parallel connection of additional current path 26. A pulse width recording device is provided in injection control unit 4. This can expediently be supplied directly using the control signals for switching unit 9. This connects an additional current flow path 16 in parallel to injectors 1.

In this way, the resistance in the main current path between the two supply strands 2 and 3 decreases. As a result, the time constant of the current path of the main current path also decreases.

The additional current paths 26 can be implemented by resistors, capacitors and/or a constant current source.

Figure 6:
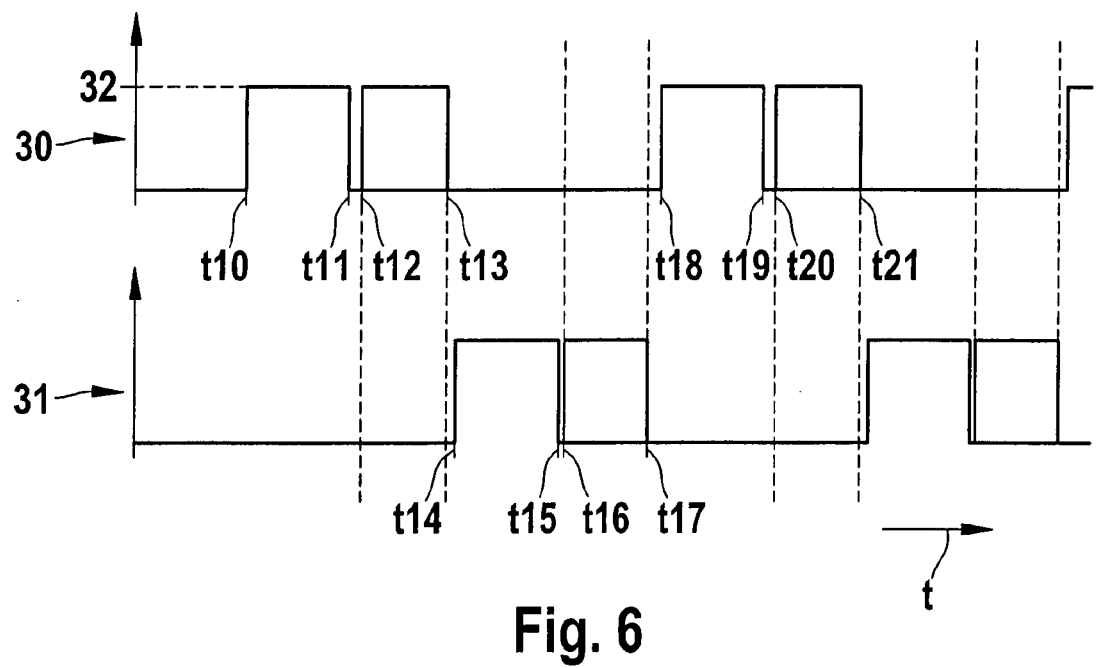
FIG. 6 shows a flow chart of a communications method for one of the specific embodiments.

FIG. 6 shows schematically a time sequence for data transmission between an injection control unit and two injectors 30, 31 over time t. The first injector 30 is first activated by applying current pulses having an amplitude 32 to this injector 30 at the given times t10 and t11. The individual current pulses are indicated schematically as their envelopes. After the activation of the injector, that is, after the injection of fuel, data can be transmitted to injector 30. For this purpose, beginning at time t12 and to time t13 the first injector continues to be addressed. During the transmission of the data, the average current of the two-position-controlled power supply is reduced. This is achieved by a slow clocking. For this, the upper and the lower threshold value of the two-position-controlled power supply is changed. The average current is now preferably less than the current necessary to activate the injector.

In appropriate embodiments of the injector, transmission takes place at a clocking that is above the clock pulse that is used to activate the injector. In the process, it is possible that an injection is suppressed in the injector by switching elements.

The injection control unit can transmit data to injector 30, according to the method described before. The data transmission has to be ended before second injector 31 is activated at time t14. After the injection phase of second injector 31, at time t16, a data transmission to second injector 31 can be carried out. The data transmission to second injector 31 is ended, in turn, before first injector 30 is activated again. At times t20 and t21 a data transmission can take place from first injector 30 to the injection control unit. The data transmission from second injector 31 to the injection control unit can also take place after the activation of second injector 31. A plurality of modifications of the data transmission between the individual actuation phases for magnetic actuators is possible. The example from FIG. 5 can be broadened without any trouble to cover a larger number of injectors or can be implemented in the case of a shut down engine The data transmission units preferably have an identification device for the average current. This can be implemented, for instance, in that the data transmission units also have a pulse width identification device. In this instance, a change in the resistance of the coils can advantageously be taken into consideration for the determination of the average current. If the pulse width exceeds the boundary value, the average current is more than a value that is assigned to the boundary value of the pulse width. The data transmission unit transmits no data if the pulse width is less than the boundary value.

Typically, the pulse width falls below the boundary value when an injector is activated. At this time no data transmission is possible anyway, since it would interfere with the control of the injector.

Figure 7:
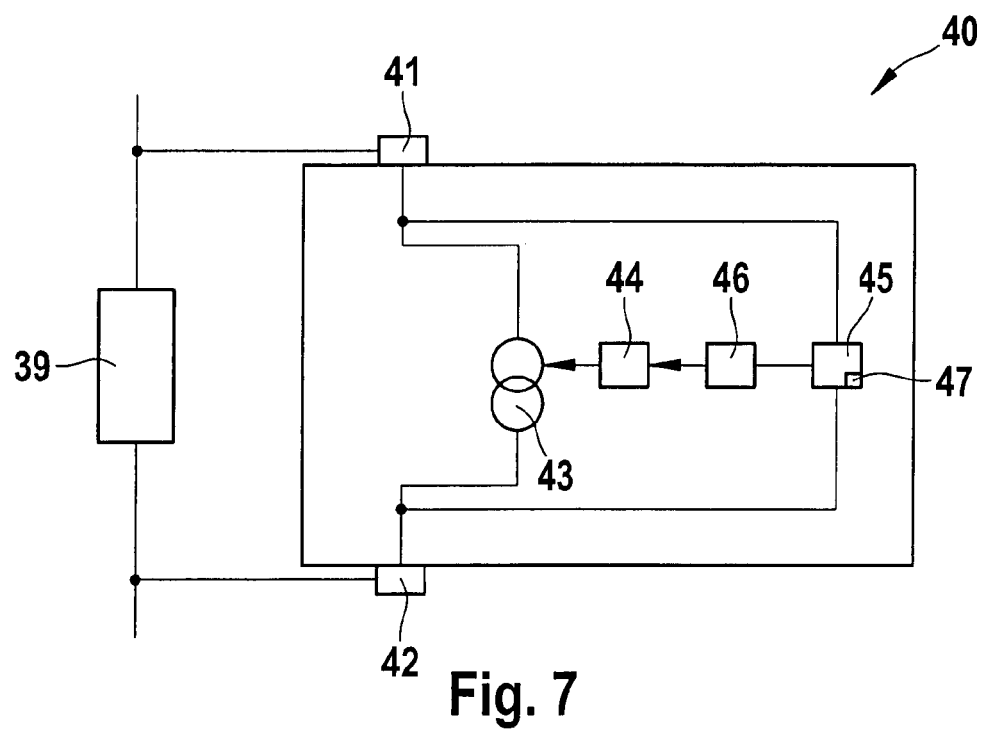
FIG. 7 shows a block diagram of a fourth specific embodiment of the communications device according to the present invention.

In a fourth specific example embodiment (FIG. 7) a communications device 40 is provided which is suitable for sending and receiving data. The communications device can be integrated both into the injectors and into the control unit. The consumer 39 of the injector is connected to the two-position-clocked power supply. The communications device is connected in parallel to the consumer via their terminals 41 and 42. A constant current source 43 is located in the communications device, which, in combination with a transmitting unit 44, changes the current pulse width and thus transmits the data. Furthermore, there is a pulse width identification device 45 having integrated signal evaluation 47, which records the length of the current pulses and evaluates them to form digital signals. A protective circuit 46 can compare an instantaneously determined pulse width to a threshold value, and if the threshold value is exceeded, it is prevented that constant current source 43 emits a current.

Although the present invention has been described with the aid of preferred exemplary embodiments, it is not limited to these.

In particular, the communications device with the switching device can be connected at any desired place to supply strand 2, 3. For this purpose, the communications device can have its own supply terminals. An integration of the communications device into control device 4 or into one of injectors 1 is not essential.

The communications device can be broadened to the extent that it quantifies the pulse width into more than two discrete logical levels. This makes possible a greater transmission rate.

What is claimed is:

1. A communications device, comprising:
   a supply terminal adapted to be connected to a two-position-controlled power supply;
   a plurality of injectors connected in parallel, wherein the injectors are connected to the supply terminal;
   a pulse width recording device coupled to the supply terminal and adapted to record a pulse width of current pulses that flow through the supply terminal;
   a measuring resistor housed in the power supply to measure the current pulses at a selected measuring tap;
   a control unit that controls the current pulse flow; and
   a signal processing device adapted to assign a first logical level to a first recorded pulse width and assign a second logical level to a second recorded pulse width.

2. A communications device comprising:
   a supply terminal adapted to be connected to a two-position-controlled power supply;
   a plurality of injectors connected in parallel, wherein the injectors are connected to the supply terminal;
   a measuring resistor housed in the power supply to measure the current pulses at a selected measuring tap; and
   a switching device adapted to increase current flow through the supply terminal for transmitting a first logical level, in order to reduce a pulse width of current pulses of the two-position-controlled power supply,
   wherein the switching device turns off and operates in a blocking manner as controlled by a control unit if a specified current threshold value is exceeded.

3. The communications device as recited in claim 2, further comprising:
   a pulse width recording device coupled to the supply terminal and adapted to record a pulse width of current pulses that flow through the supply terminal; and
   a signal processing device adapted to assign the first logical level to a first recorded pulse width and a second logical level to a second recorded pulse width.

4. The communications device as recited in claim 3, further comprising: a protective circuit adapted to prevent an increase in the current flow through the supply terminal when the pulse width recording device records a pulse width that lies within a predetermined pulse width interval.

5. The communications device as recited in claim 2, further comprising:
   a constant current source adapted to increase the current flow through the supply terminal.

6. The communications device as recited in claim 2, further comprising:
   a bypass resistor which forms a series connection with the switching device, the series connection connecting the supply terminal to a reference potential.

7. A data transmission method via a supply terminal, comprising:
   connecting the supply terminal to a two-position power supply;
   connecting a plurality of injectors to the supply terminal, wherein the injectors are connected in parallel;
   recording a pulse width of current pulses of the two-position power supply at the supply terminal;
   measuring the current pulses over a measuring resistor at a selected measuring tap; and
   assigning a first logical level to a first recorded pulse width and a second logical level to a second recorded pulse width.

8. The data transmission method according to claim 7 wherein the connecting step, the recording, and the assigning is adapted for receiving, and wherein the method further comprises:
   raising a current flow through the supply terminal for transmitting a first logical level of at least two logical levels, the raising adapted for transmitting data.

9. A data transmission method via a supply terminal, comprising:
   connecting the supply terminal to a two-position power supply;
   connecting a plurality of injectors to the supply terminal, wherein the injectors are connected in parallel;
   measuring the current pulses over a measuring resistor at a selected measuring tap;
   raising a current flow through the supply terminal for transmitting a first logical level of at least two logical levels; and
   turning off a switching device if a specified current threshold value is exceeded, and wherein, the switching device operates in a blocking manner after being switched off.

* * * * *